Jan. 12, 1971 R. W. WISE 3,554,003
METHOD OF DETERMINING CURING CHARACTERISTICS OF AN ELASTOMER
Filed April 10, 1968 7 Sheets-Sheet 1

INVENTOR
RALEIGH W. WISE

BY *Richard O. Zerbe*
AGENT

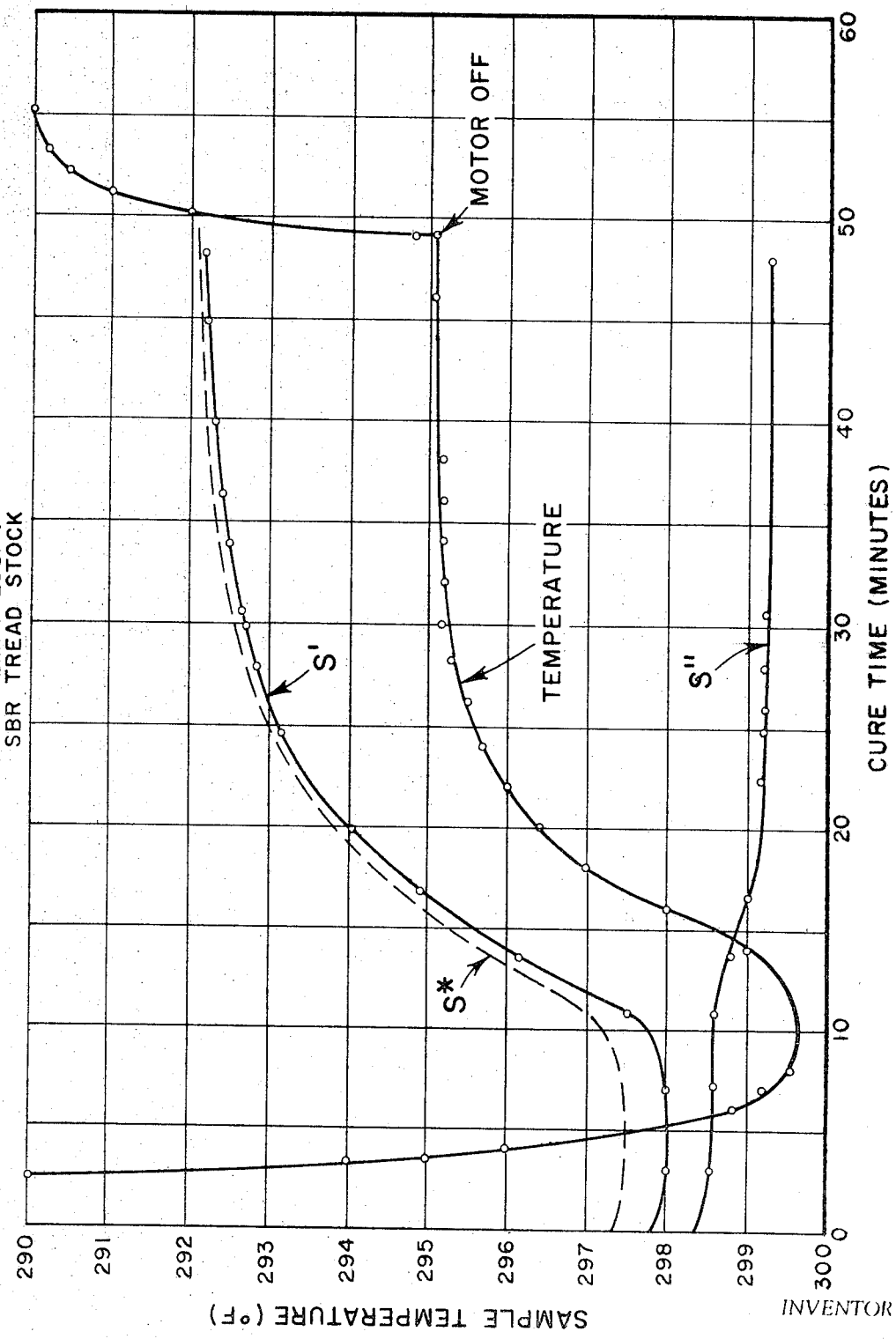

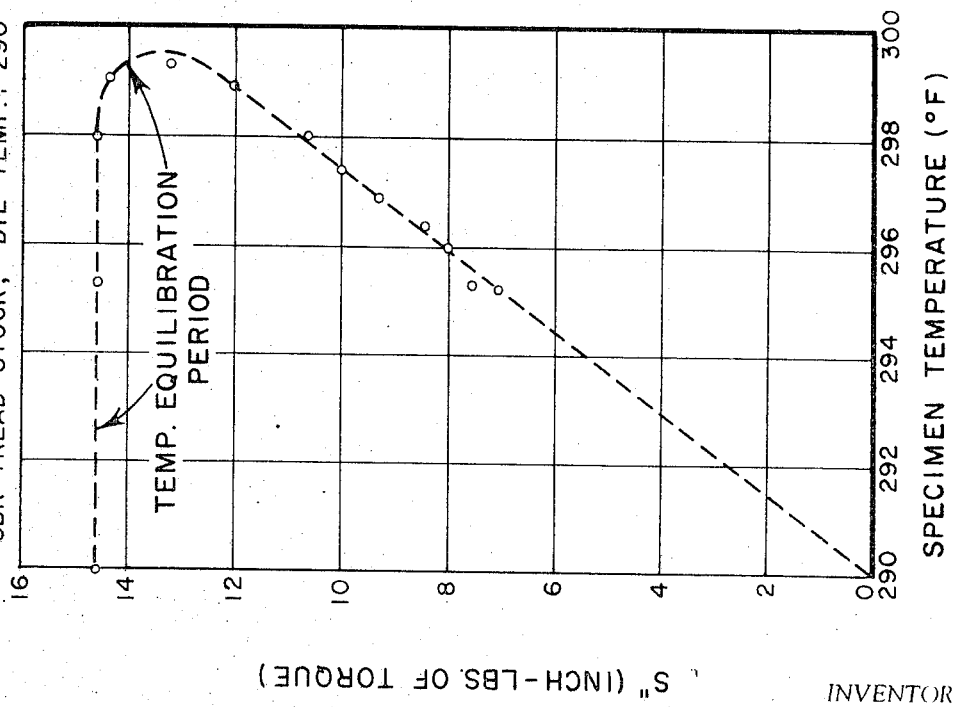

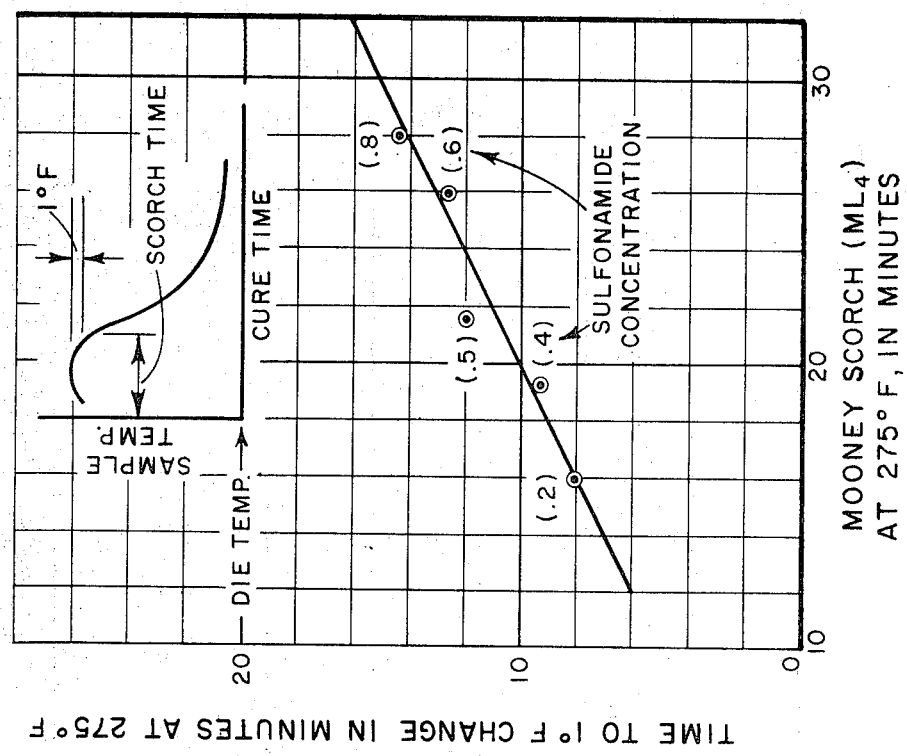
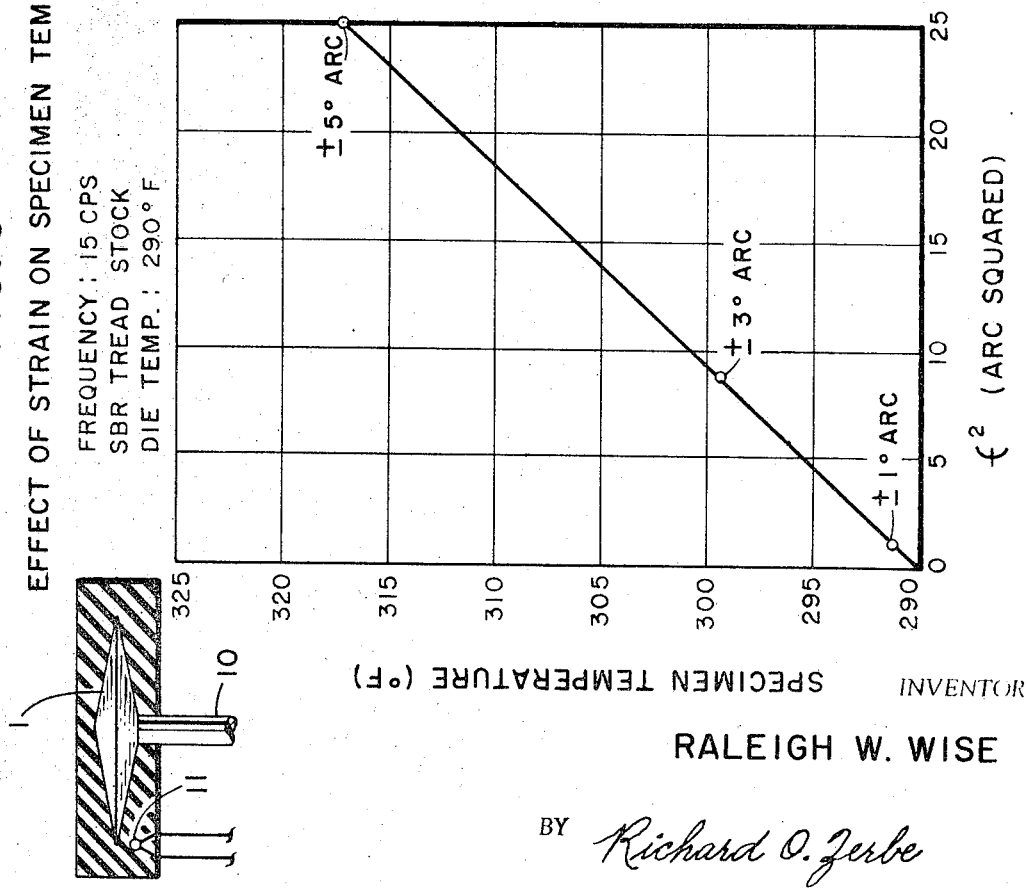

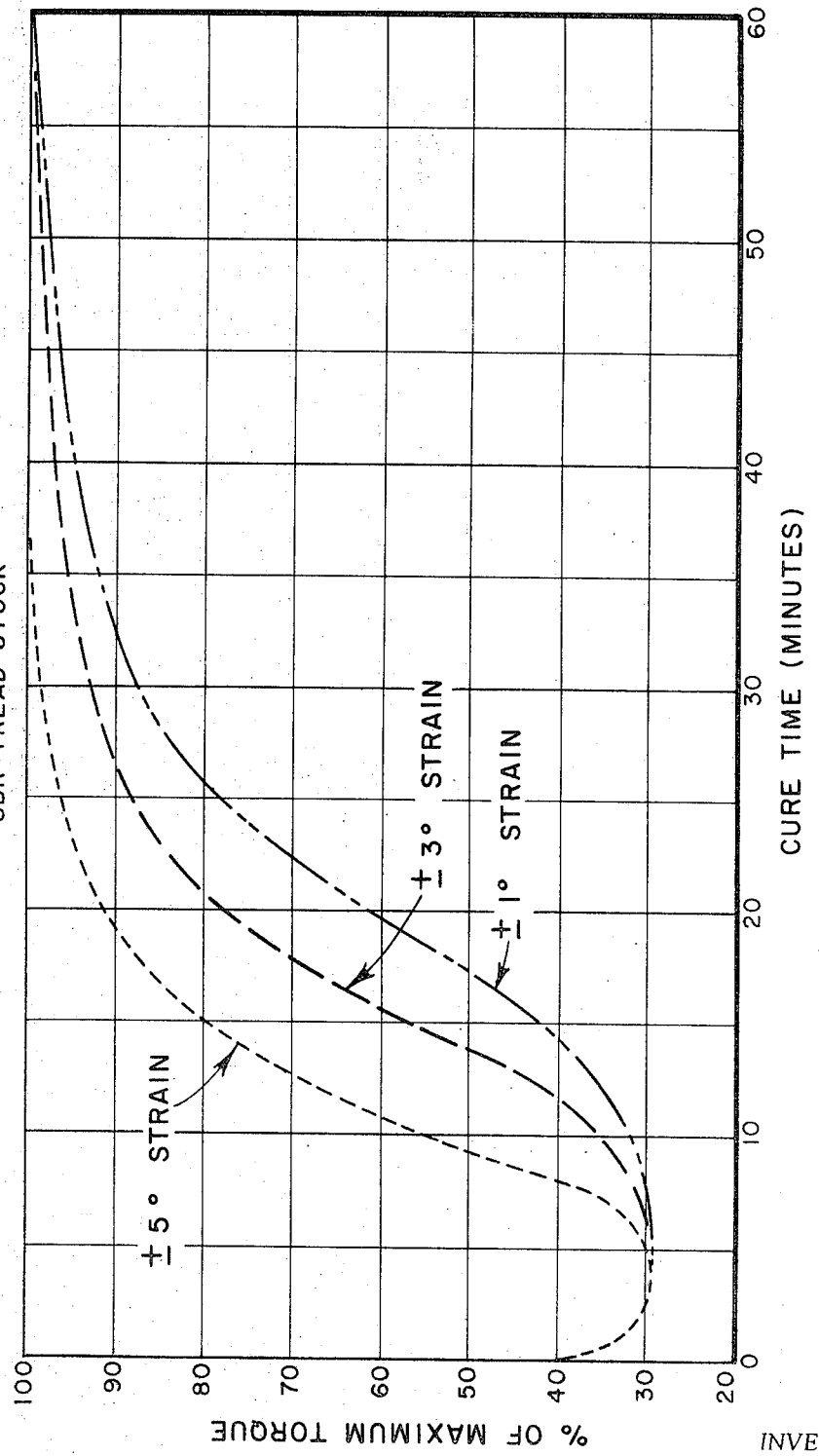

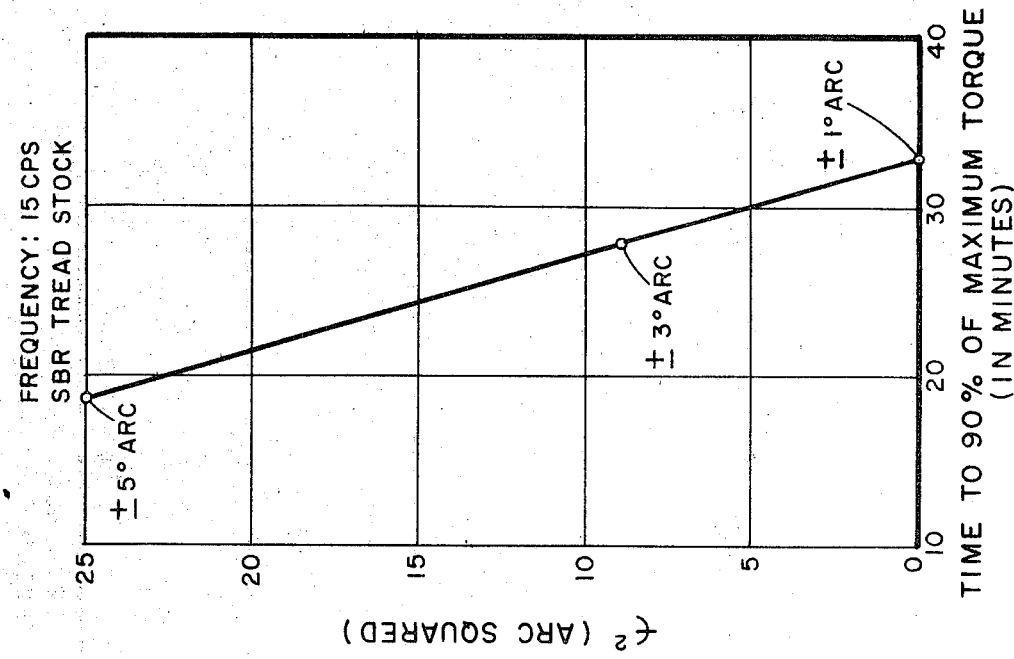
FIG. 8 EFFECT OF STRAIN ON TIME TO OPTIMUM CURE
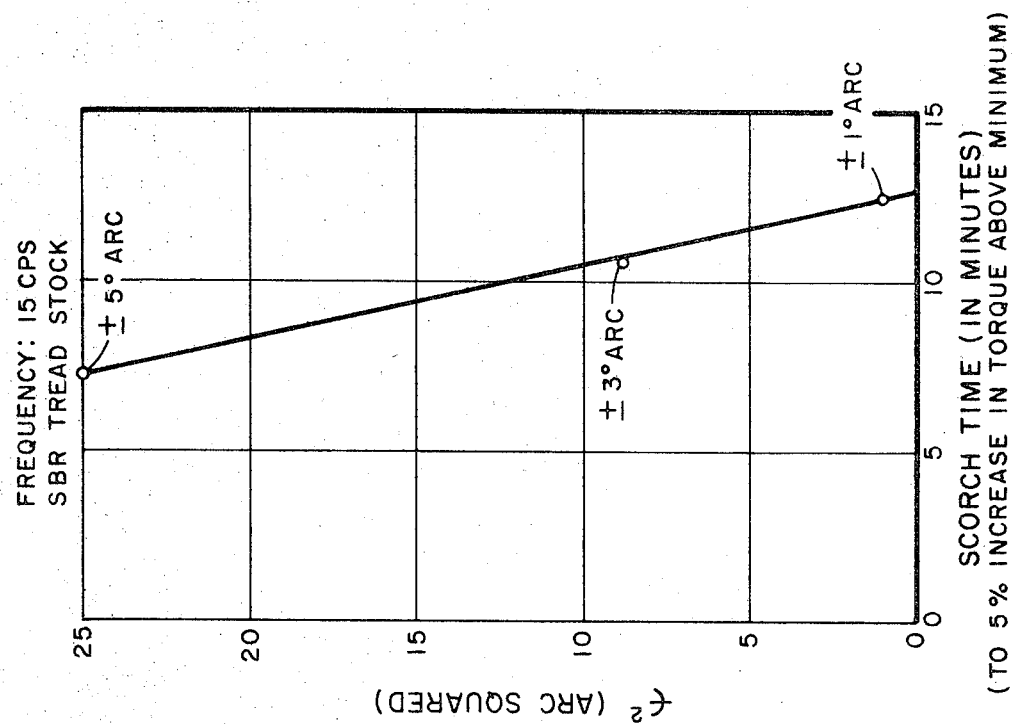
FIG. 7 EFFECT OF STRAIN ON SCORCH TIME
INVENTOR
RALEIGH W. WISE

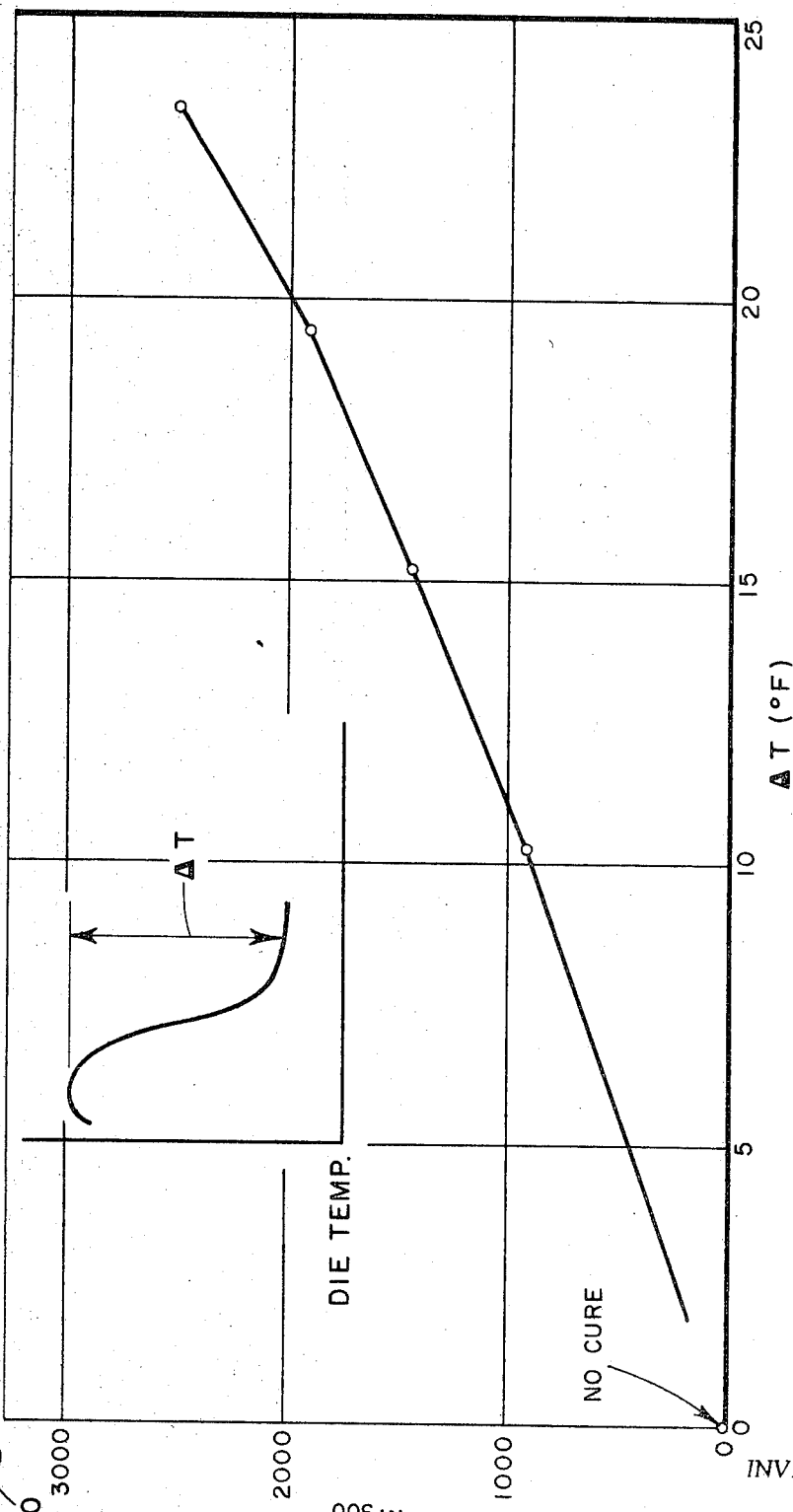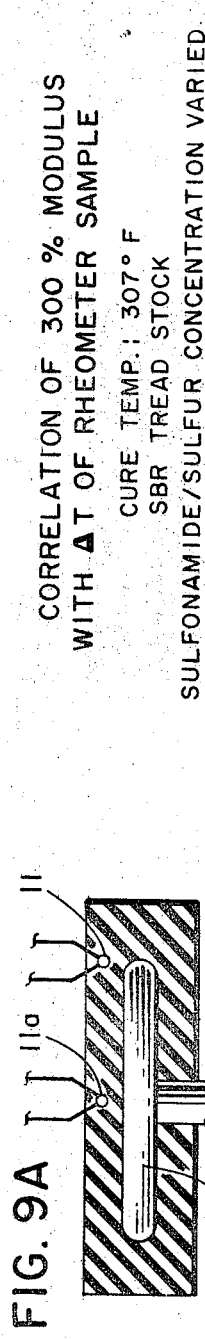

United States Patent Office 3,554,003
Patented Jan. 12, 1971

3,554,003
METHOD OF DETERMINING CURING CHARACTERISTICS OF AN ELASTOMER
Raleigh Warren Wise, Akron, Ohio, assignor to Monsanto Company, St. Louis, Mo., a corporation of Delaware
Filed Apr. 10, 1968, Ser. No. 720,305
Int. Cl. G01n 25/00
U.S. Cl. 73—15.6  7 Claims

ABSTRACT OF THE DISCLOSURE

The curing characteristics and hysteresis of an elastomer are determined by measuring and recording the temperature change of a confined sample subjected to dynamic stress at a rate sufficient to increase the sample temperature.

BACKGROUND OF THE INVENTION

The invention is in the elastomer-testing instruments field. There are commercial instruments used in the rubber industry which measure the temperature of rubber at different rubber processing stages. The Viscourometer described in Beatty's U.S. Pat. 3,182,494 (1965) and the Monsanto Oscillating Disk Rheometer described by Decker, Wise, and Guerry in Rubber World, December 1962, page 68, have provisions for measuring a curing rubber sample temperature. Other instruments used in the rubber industry measure the increase in temperature of cured rubber subjected to stress as a means of assessing service performance since development of heat is detrimental to cured rubber but provide no information on curing characteristics. The Firestone Flexometer described in Prettyman's U.S. Pat. 2,713,260 (1955) is of the latter type.

SUMMARY OF THE INVENTION

The invention is a method for determining the curing characteristics and hysteresis of an elastomer sample. To measure these properties, the sample which is under pressure is subjected to stress and strain under dynamic conditions at a rate and degree sufficient to cause the temperature of the sample to rise above the ambient temperature. There may be embedded in the sample a disk which oscillates at a frequency of 100 to 1000 cycles per minute. The sample is usually heated and the curing characteristics are determined by measuring and recording the temperature change of the sample under dynamic stress and resultant dynamic strain.

DESCRIPTION OF THE DRAWINGS

FIG. 2 is a graph illustrating the dynamic moduli and sample temperature versus cure time of a rubber sample.

FIG. 3 is a graph illustrating the correlation of S″ with sample temperature during cure.

FIG. 4 is a graph illustrating the correlation of strain work with sample temperature.

FIG. 5 is a graph illustrating the effect of strain on sample temperature. The insert illustrates the position of the temperature sensor in one embodiment of the invention employed in obtaining the graphs of FIGS. 2–8.

FIG. 6 is a graph illustrating the effect of strain on a Rheometer cure curve.

FIG. 7 is a graph illustrating the effect of strain on scorch time.

FIG. 8 is a graph illustrating the effect of strain on time to optimum cure.

FIG. 9 is a graph illustrating the correlation of modulus of elasticity at elongation of 300% determined from conventional press cures with the change in temperature.

FIG. 9a is a sectional view of the rotor and sample cavity in a preferred embodiment of the invention employing two thermocouples used in obtaining the graphs of FIGS. 9 and 10 and illustrates the position of the thermocouples, one at the point of minimum strain and the other at a point of maximum strain.

FIG. 10 is a graph illustrating the correlation of Mooney scorch with change in temperature of the Rheometer sample.

PREFERRED EMBODIMENTS OF THE INVENTION

Figure 1:
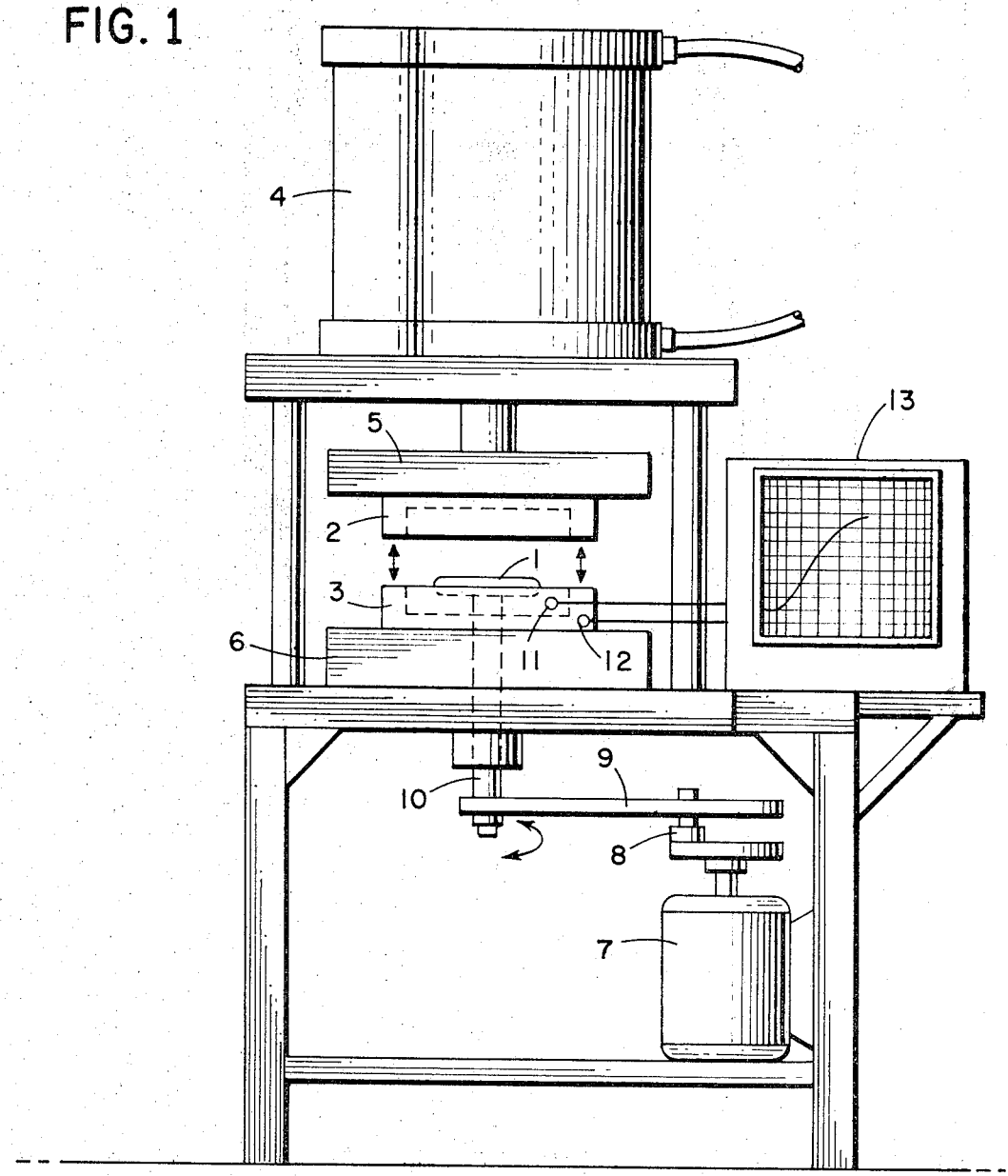
FIG. 1 is a schematic view partly in section of a device suitable for use in the practice of this invention.

FIG. 1 illustrates a rubber-testing instrument similar to the Monsanto Oscillating Disk Rheometer. An elastomer sample is placed around a disk 1 and the dies 2 and 3 are brought together by means of an air cylinder 4 to enclose the sample under pressure in the die cavity. Heated platens 5 and 6 heat the sample and maintain the sample temperature at a predetermined temperature. The disk 1 embedded in the rubber sample is oscillated by the motor 7 which is connected to the disk 1 by an eccentric 8, a connecting arm 9, and a shaft 10. The arc through which the connecting arm moves is substantially constant but is adjustable by varying the throw of the eccentric. A sample temperature sensor 11 and a die temperature sensor 12 are connected to a temperature recorder 13 in such a way as to measure the difference in temperature between the rubber sample and the dies.

When the Monsanto Oscillating Disk Rheometer is operated so that a rubber sample is deformed sinusoidally at a frequency of 900 cycles per minute, a significant amount of heat is generated within the rubber sample causing its temperature to increase.

Operating the Rheometer at a frequency of 900 cycles per minute, S* (dynamic modulus), S′ (elastic modulus), and S″ (loss modulus) are determined throughout the curing cycle. The temperature of the die is measured with a type J thermocouple inserted into the upper die. The tempertaure of the rubber sample is measured with a type J thermocouple embedded in the sample about halfway between the edge of the disk and the die wall on a vertical line from the edge of the disk to the die wall parallel to the shaft of the disk. Both temperatures are recorded continuously.

The graph of FIG. 2 illustrates the effect of an elastomer sample cure on the sample temperature during a typical Rheometer cure obtained at approximately ±3° arc on a styrene-butadiene tread stock. Sample temperature, S*, S′, and S″ are plotted. The temperature of the rubber sample is measured continuously throughout the curing cycle and is recorded on a Rheograph for comparison purposes. The sample requires about ten minutes to reach a maximum temperature of 229.7° F., which is 9.7° above the original die temperature of 290° F. The temperature of the sample decreases as it proceeds to cure. When the sample is near maximum cure, the temperature of the sample is only 5.1° F. above the die temperature.

FIG. 3 illustrates the relationship between S″ and sample temperature. Since the energy generated by deforming rubber in the Rheometer at substantially constant strain is directly proportional to the loss modulus (S″), the increase in temperature of the sample is proportional to S″. After the temperature equilibration period when the temperature of the curing sample has reached a plateau, the degree to which it remains above die temperature is proportional to the loss modulus (S″).

FIG. 4 also illustrates the relationship between S″ and sample temperature. In the experiment which the graph of FIG. 4 illustrates, the strain (arc) is varied in order to change the magnitude of S″. The product of S″ in inch-pounds and degrees of arc is plotted against the maximum temperature to which the rubber sample rises. Again a straight line relationship between S″ and sample temperature is demonstrated. Therefore, S″ and the heat buildup characteristics of an elastomer can be determined either by determining S″ or by actually measuring the temperature of the elastomer sample. The maximum temperature rise and S″ of the uncured sample are each an index of the increase in temperature which will occur during rubber processing. The temperature rise and S″ of the cured sample are each an index of the heat which will be generated by the cured article when it is used in dynamic service. The hysteresis is the loss of energy in the form of heat due to hysteresis. Thus, hysteresis and temperature rise are proportional throughout processing and service life of a rubber article.

The graph of FIG. 5 illustrates the effect of strain on sample temperature. When a sample of rubber is strained sinusoidally, the temperature increases as the square of the strain. This is illustrated in FIG. 5 which shows the increase in temperature of a styrene-butadiene black masterbatch obtained when strains of $\pm 1°$, $\pm 3°$, and $\pm 5°$ of arc are applied in the Rheometer. The graph illustrates that the temperature increases only 1° F. when an arc of $\pm 1°$ is used but increases 27° F. when the strain is increased to $\pm 5°$. It is preferred to operate at the lowest practical strain, usually $\pm 1°$, when isothermal curing characteristics are being studied, and at $\pm 3°$ or $\pm 5°$ when studying the curing characteristics which will be affected by the heat generated during processing, e.g., scorch during extrusion. The insert on FIG. 5 illustrates the position of the temperature sensor 11 contained in the rubber during experiments, results of which are described on FIGS. 2 to 8, inclusive. A biconical disk is illustrated.

The graph of FIG. 6 illustrates the effect of strain on the Rheometer cure curve of a styrene-butadiene rubber tread stock. FIG. 6 compares the cure curves obtained at strains $\pm 1°$, $\pm 3°$, and $\pm 5°$ arc. As the strain is increased, the scorch time and time to optimum cure are reduced and the cure rate is increased. These differences are a reflection of the increase in sample temperature which accompanies increasing strains.

The graph of FIG. 7 illustrates how strain affects scorch time. At $\pm 1°$ arc, the scorch time is essentially identical to the theoretical value indicated by the point at which the extrapolated plot of strain squared versus scorch time intersects the scorch time ordinate, viz, 12.5 minutes at $\pm 1°$ arc versus 12.6 minutes at zero strain. Therefore, when the Rheometer is operated at a $\pm 1°$ arc, essentially isothermal conditions prevail and the measured scorch time is not affected by the hysteresis of the rubber. At a $\pm 3°$ arc, the scorch time is reduced to 10.5 minutes as a result of the heat generated within the sample.

The graph of FIG. 8 illustrates the effect of strain on time to optimum cure. At $\pm 1°$ arc, the time to optimum cure deviates only slightly from the isothermal value. At $\pm 3°$ of arc, the time to optimum cure is reduced from 32.5 minutes at 1° of arc to 27.6 minutes.

The temperature of elastomer sample increases considerably when operating the Rheometer at strains of $\pm 3°$ or $\pm 5°$ arc. The increase in temperature of the specimen is directly proportional to its viscosity, i.e., S″. This means that the temperature of the sample will increase higher than the die temperature and will change during the curing cycle with a concomitant effect on the cure curve. Therefore, changes in the composition of the rubber stock which affect its viscosity and processibility will be detected using this invention even though its curing characteristics are not altered.

Although the preferred method for increasing sensitivity is to increase the strain, it is also feasible to increase the diameter of the disk. On low modulus stocks on which additional sensitivity is desirable, a large disk (1.8″ diameter) can be used. This is desirable when isothermal curing characteristics are being studied at $\pm 1°$ arc. The temperature rise will be somewhat greater than when the standard 1.5″-diameter disk is used.

In a preferred arrangement, the temperature of the rubber sample is measured by the difference between two temperature sensors, one located at a point of minimum strain and the other at a point of maximum strain. A portion of the sample for determining temperature of the sample unstrained may be contained in a separate die compartment, if desired. However, it is more convenient to use a flat disk in a single die compartment and place one temperature sensor at the edge of the disk and another at the center. The technique of using a flat disk to stress the rubber and placing one thermocouple at the edge of the disk and another at the center of the disk overcomes the problem of thermal lag of the sample. The temperature difference between the two couples is measured. The temperature of the rubber at the edge of the disk increases when the disk is oscillated; whereas, the temperature of rubber near the center of the disk is not affected significantly. The temperature of the rubber increases in proportion to the square of the applied strain.

Mooney viscosity is proportional to the maximum increases in sample temperature. An incremental change in temperature after the temperature of the curing sample has reached a plateau correlates well with scorch times measured by either the Mooney or Rheometer. Also, the rate of cure, percent of cure, and amount of reversion as measured by conventional modulus-dependent methods correlate with change in temperature values.

The graphs of FIGS. 9 and 10 were obtained from data employed with thermocouples 11 and 11a located as illustrated in FIG. 9a.

The graph of FIG. 9 illustrates the correlation of 300% tensile modulus determined from conventional press cures with change in temperature of the Rheometer sample employing a styrene-butadiene copolymer rubber stock in which the sulfenamide-sulfur concentration varied. The temperatures plotted are the differences in temperature between the rubber sample at minimum strain and at maximum strain. The stocks were cured in a press at 307° C. and the Rheometer was run at 307° C. The cure times were selected by taking the time to 90% of maximum torque determined with the rheometer. This plot of sample temperature with tensile modulus gives a slightly nonlinear curve. Plotting the reciprocal of the change in Rheometer specimen versus tensile modulus (not illustrated) yields a linear correlation as predicted by theory.

The graph of FIG. 10 illustrates that Mooney scorch correlates very well with scorch measured by the temperature change technique. In the case of correlating the time to 90% of maximum cure obtained with the Rheometer, a slightly nonlinear relationship results (not illustrated) because the modulus of the rubber is actually a function of the reciprocal of the change in temperature.

It is intended to cover all changes and modifications of the examples of the invention herein chosen for purposes of disclosure which do not constitute departures from the spirit and scope of the invention. The matter contained in each of the following claims is to be read as part of the general description of the present invention.

What is claimed is:

1. A method for determining curing characteristics of an elastomer which comprises:
   completely confining a sample of uncured elastomer under pressure,
   applying dynamic stress and strain at a rate and degree sufficient to increase the temperature of a portion of the sample significantly above ambient temperature at temperature equilibrium between the unstrained sample and the confining means, and
   measuring the difference in temperature between the confined sample at a point where temperature is significantly affected by the dynamic stress and strain and the equilibrium temperature said equilibrium temperature being determined at a point in the confined sample not significantly affected by the dynamic stress and strain.

2. A method for determining the curing characteristics and hysteresis of an elastomer which comprises:

completely confining a sample of uncured elastomer under pressure, heating the sample to establish an ambient temperature and initial temperature equilibrium between the unstrained sample and confining means, subjecting the sample to oscillatory rotary shearing force at a predetermined frequency and arc sufficient to increase the temperature of a portion of the sample significantly above the initial equilibrium temperature, and simultaneously measuring the difference in temperature between two points in the sample one at a point where temperature is not significantly affected by the shearing force and the other at a point where temperature is significantly affected by the shearing force.

3. A method according to claim 2 wherein the force is applied by a disk embedded in the sample oscillated at a frequency within the range of 100 to 1000 cycles per minute.

4. A method according to claim 3 wherein the disk embedded in the sample is oscillated at a frequency of about 900 cycles per minute.

5. A method according to claim 2 wherein the difference in temperature is continuously recorded.

6. An apparatus for determining the curing characteristics of an elastomer comprising means for completely confining a sample of the elastomer under pressure in a chamber, means for imposing an oscillatory rotary shearing force in the elastomer at a frequency and amplitude sufficient to increase the temperature of the elastomer in the proximity of maximum strain significantly above ambient temperature at initial temperature equilibrium between the unstrained sample and confining means, a temperature sensor in the proximity of minimum strain, and a temperature sensor in the proximity of maximum strain.

7. An apparatus as defined in claim 6 which includes means to record the difference between the temperature sensors and heating means to establish an ambient temperature and initial temperature equilibrium between the unstrained sample and confining means.

References Cited

UNITED STATES PATENTS

| | | | |
|---|---|---|---|
| 2,713,260 | 7/1955 | Prettyman et al. | 73—101 |
| 3,182,494 | 5/1965 | Beatty et al. | 73—101 |
| 3,039,297 | 6/1962 | Peter et al. | 73—67.1 |

JAMES J. GILL, Primary Examiner

H. GOLDSTEIN, Assistant Examiner